GEORGE RICHARDSON.
Improvement in Spindle or Vertical Shafts.
No. 126,089.            Patented April 23, 1872.
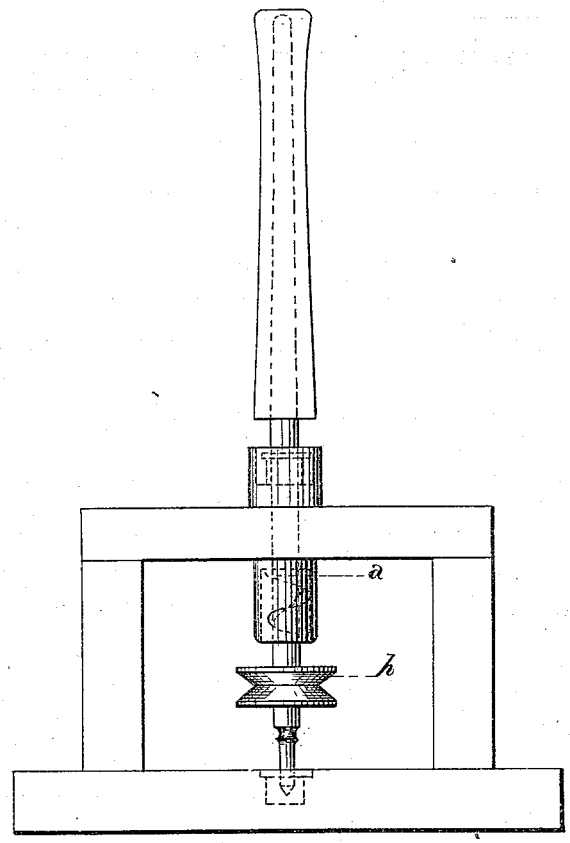
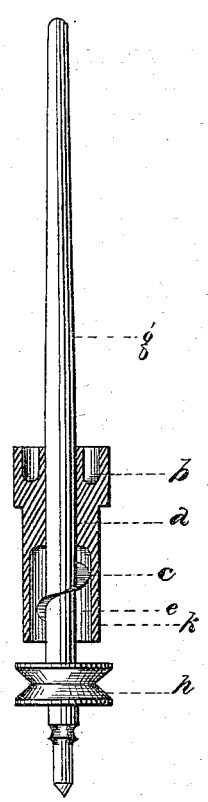
Witnesses:            Inventor:
Charles H. Collins,            Geo Richardson.
Edward S. Woodies

UNITED STATES PATENT OFFICE.

GEORGE RICHARDSON, OF LOWELL, MASSACHUSETTS.

IMPROVEMENT IN SPINDLES OR VERTICAL SHAFTS.

Specification forming part of Letters Patent No. 126,089, dated April 23, 1872.

I, GEORGE RICHARDSON, of Lowell, in the county of Middlesex, State of Massachusetts, have invented an Improved Spindle or Vertical Shaft; and I do hereby declare that the following is a full, clear, and exact description of the construction and operation of the same, reference being had to the annexed drawing making a part of this specification, of which—

Figure 1 is an elevation of a machine embodying my invention. Fig. 2 is an elevation representing spindle or vertical shaft G, with the bearing A, reservoir B, spiral projection or wing C attached to spindle G in the inclosed chamber E, shell K, and the grooved pulley H, to which power and speed are imparted.

To enable others skilled in the art to make and use my invention, I will proceed to describe its construction and operation.

My invention consists in providing a spindle or vertical shaft, constructed and arranged in such a manner as to prevent the lubricating fluid from passing out at the lower ends of the bearings, where it would be brought within the influence of the shaft's centrifugal force and immediately thrown off. In most cases the loss of the lubricator is a trifle compared with the damage sustained in the destruction of bearings of vertical shafts or spindles, which necessitates vexatious delays and expensive stoppage of machinery; and, to guard against this, the mechanic and manufacturer are obliged to employ trusty and expensive persons to attend to and keep such bearings and shafts properly lubricated or cared for.

The construction and operation of my invention are as follows: The spiral wings C are attached to the spindle or shaft G, Fig. 2, in such a manner as to generate a current of air against the lower end of the bearing A, thereby destroying or counteracting the effect of gravitation on the lubricant when the spindle is in motion.

It can readily be seen that the wing C, when put in motion in the proper direction, acts as a receiver of air at the lower end and discharges it upward. With limited means of escape, this air becomes compressed to such a degree as to prevent the lubricating fluid from escaping at the lower end of the bearing, thereby causing it to be retained along the bearing and in the reservoir B.

What I claim as my invention, and desire to secure by Letters Patent, is as follows:

I claim the spiral wing C, Fig. 2, inclosed or exposed underneath or above a bearing or their equivalents, for the purpose of keeping a lubricant at the upper extremity of a bearing, all arranged substantially as described and for the purpose herein set forth.

GEO. RICHARDSON.

Witnesses:
EDWARD S. WOODIES,
CHARLES H. COLLINS.